Nov. 23, 1965     R. KÖHLI     3,219,155
ELECTRO-MECHANICAL BRAKES ESPECIALLY FOR MACHINE TOOLS
Filed Aug. 31, 1960     4 Sheets-Sheet 1
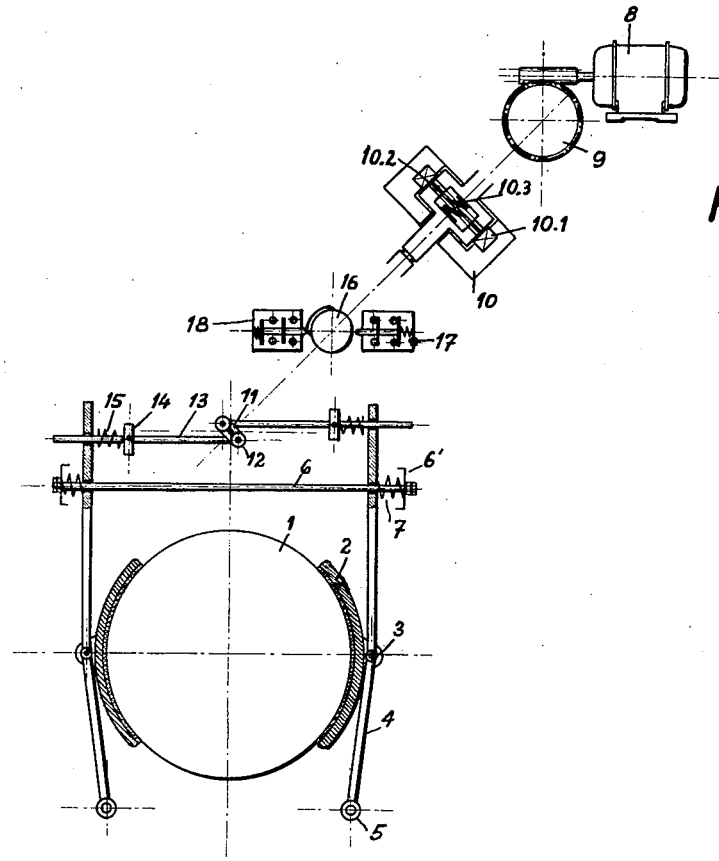
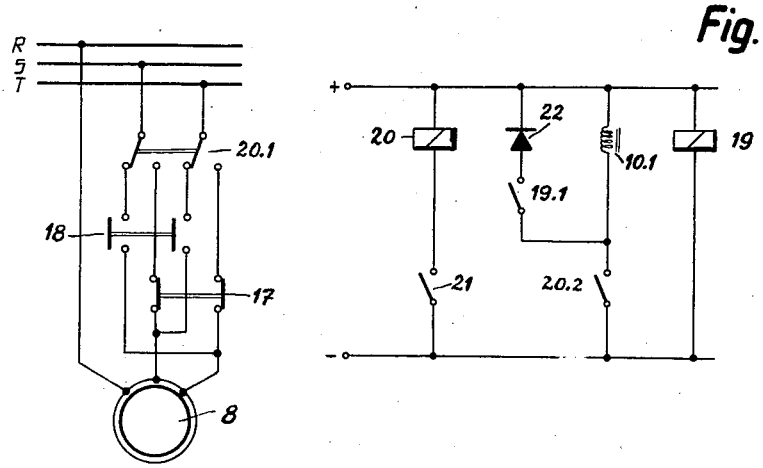
Inventor
Roland Köhli
By Richard Low
 agt

Fig. 3
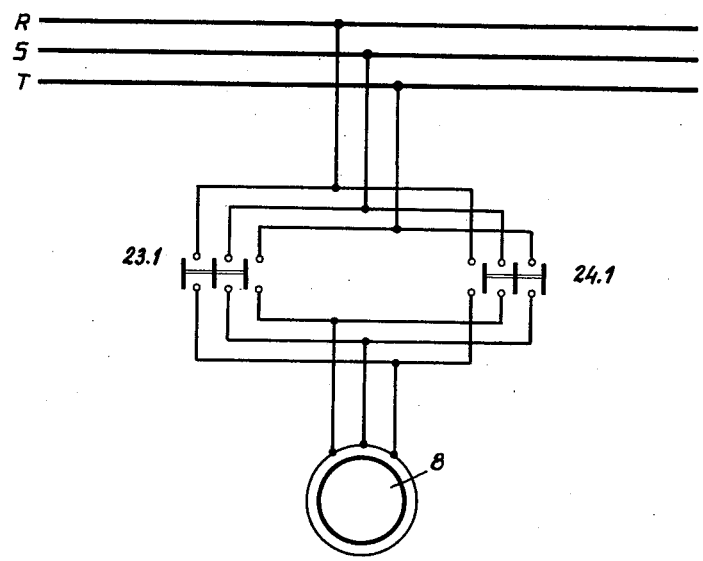
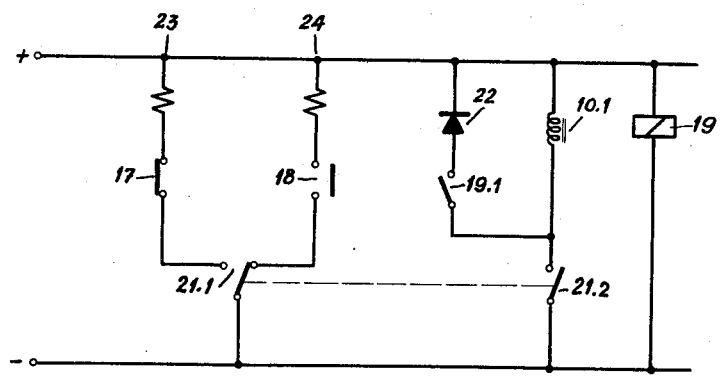
Fig. 3A
Inventor
Roland Köhli

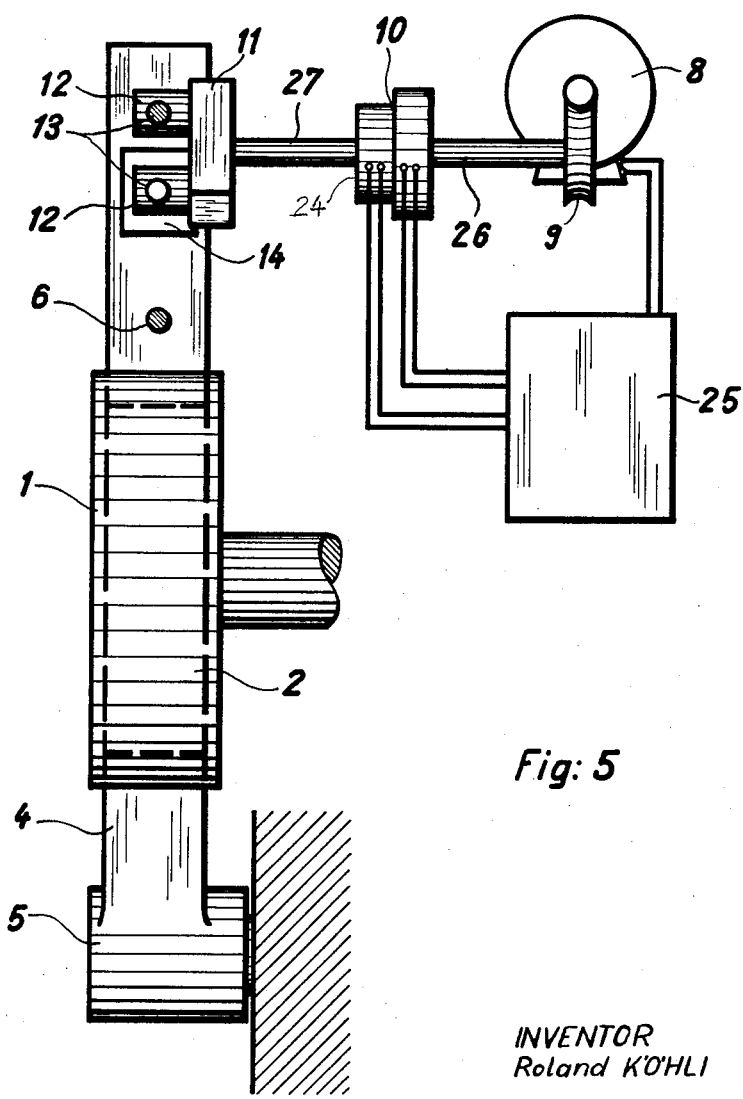

United States Patent Office 3,219,155
Patented Nov. 23, 1965

3,219,155
ELECTRO-MECHANICAL BRAKES ESPECIALLY FOR MACHINE TOOLS
Roland Köhli, Bergstrasse 6, Lucerne, Switzerland
Filed Aug. 31, 1960, Ser. No. 53,122
Claims priority, application Switzerland, Sept. 2, 1959, 77,787
3 Claims. (Cl. 188—171)

The invention relates to electro-mechanical brakes, especially for machine tools, wherein the speed of release and brake applying movements are adjustable.

In a previously proposed brake, the braking pressure is created by compression springs which urge brake shoes against a brake disc by means of a lever arrangement. The release movement of the brake shoes is effected by means of a brake release magnet or a brake release motor, the release movement in dependence on time being exactly predetermined. Since the actuation of the brake is effected by suddenly removing the release power for counteracting the compression springs, the brake action takes place suddenly and the movement of the brake shoes in dependence on time cannot be controlled. Owing to the resiliency of the brake lever arrangement undesired oscillations of the braking power may occur.

Again, a brake has been proposed wherein a brake release member is retarded during the brake applying movement without electric current by suitable damping means. However, in most cases such damping means are effected by some wear, or the damping action is not constant owing to the influence of temperature variations. Therefore the duration of the brake applying movement of such a brake is variable whereby the use of such a brake is excluded in connection with drives requiring accurate braking.

Furthermore, in connection with the proposed brakes the release means for mantaining the brakes released have to be permanently energized by electric current, which when the release periods are long as compared to braking periods causes an inadmissible heating of the brake release means.

It is an object of the invention to provide an electro-mechanical brake wherein the release movement as well as the brake applying movement is effected without damping means at a predetermned dependence on time. Furthermore, a brake release motor should remain without current while the brake is released so that during release of the brake no heating takes place.

The invention consists in an electro-mechanical brake comprising brake shoes mounted on brake levers and urged by spring pressure towards a brake disc, the brake shoes being releasable by a brake release motor, a self-holding gear arrangement being provided between the brake levers and the motor, the gear arrangement being operable in one sense of rotation for a release movement and in the opposite sense of rotation for a brake applying movement.

To make the invention clearly understood reference will now be made to the accompanying drawings, which are given by way of example and in which:

FIG. 1 diagrammatically illustrates mechanical parts of a first embodiment of the invention, FIG. 2 is an electric circuit diagram of electric parts of the brake of FIG. 1.

FIG. 3 and FIG. 3a illustrate a modified electric circuit diagram,

FIG. 4 illustrates a second embodiment of the invention and FIG. 5 shows the manner in which the mechanical and electrical elements of the apparatus of FIGS. 1 and 2 are connected.

Figure 4:
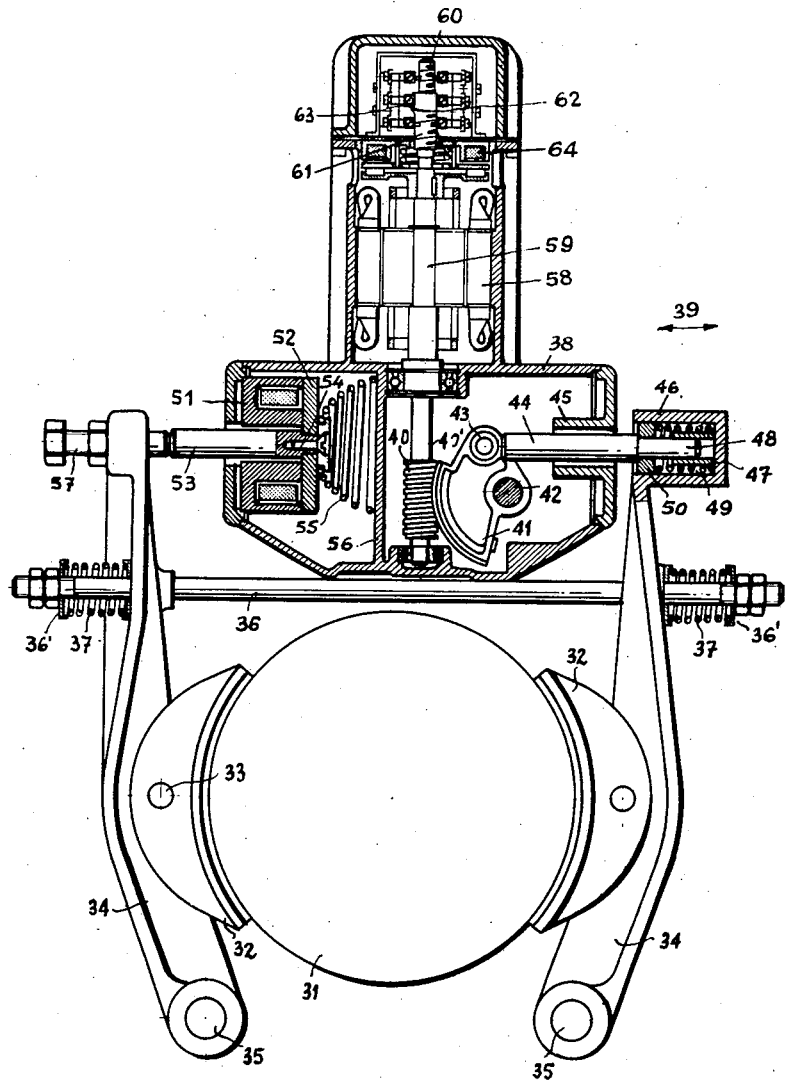

The embodiment of FIG. 1 comprises a brake disc 1 cooperating with brake shoes 2 each rotatably mounted by means of a pivot 3 on a brake lever 4. Each brake lever 4 is rotatably mounted at a pivot 5. A rod 6 is provided which transversely penetrates the brake levers 4, the ends of the rod 6 being each provided with a compression spring 7 surrounding the respective end of the rod 6. One end of each spring 7 bears against an abutment 6' of the rod 6, and the other end of the spring 7 bears aginst the adjacent brake lever 4, the brake levers 4 with the brake shoes 2 being thus urged towards the brake disc 1.

A driving motor 8 is provided which through a self-holding worm gear arrangement 9 is connected to the primary side of an electromagnetic dog clutch 10, comprising an electromagnetic coil 10.1 and flat trapezoidal dog teeth 10.2 and being so constructed that on energizing the magnetic coil 10.1 the two parts of the clutch engage through the dog teeth 10.2 against the action of a compression spring 10.3 By the action of the spring 10.3 and by suitably designing the teeth 10.2 release of the clutch on interruption of current in the magnetic coil can be ensured. The secondary side of the clutch transfers the torque created by the motor 8 to a rotatably mounted lever 11 carrying two studs 12 journalled to the adjacent ends of two rods 13 extending generally parallel to the rod 6 and transferring release power to the brake levers 4 by means of adjustable rings 14 and springs 15. To the secondary side of the clutch 10 a cam disc 16 is connected for cooperation with two double pole switches 17 and 18.

The electric control arrangement is shown in FIG. 2. A three-phase mains supply RST serves for energizing the brake release motor 8, and direct current terminals + and — serve for energizing electromagnets. In the direct current circuit there are provided a voltage sensitive electromagnet 19 having an operating contact 19.1, an electromagnetic circuit breaker 20 having two main switch-over contacts 20.1 and an auxiliary contact 20.2, and a control switch 21 for controlling the brake. The auxiliary contact 20.2 serves for operating the magnetic coil 10.1 of the dog clutch 10. A unilateral conductor or rectifier 22 is also provided in the direct current circuit. The rectifier 22 is arranged in series with the contacts 19.1 and 20.2 between the terminals of the direct current source in such a manner as to prevent current flow through the series arrangement between the terminals when the latter are energized. The rectifier 22 and the contact 19.1 are shunted across the dog clutch coil 10.1, and delay the decay of the magnetic field of the coil 10.1 in a well known manner.

FIG. 5 shows the worm gear arrangement 9 driving the input shaft 26 of the dog clutch 10 on which a switch housing 24 is mounted. The housing encloses the switches 17, 18. The output shaft 27 of the clutch 10 carries the lever 11. Conductors connect the motor 8, clutch 10, and the switches in the switch housing 24 to a control box 25 which holds the other elements of the circuit illlustrated in FIG. 2.

The arrangement described operates as follows:

When the main supply is switched on, the electromagnet 19 is energized from the direct current terminals and closes its contact 19.1, which does not yet lead to any action. When the brake is to be released the control switch 21 is closed. Thereby the electromagnet of the circuit breaker 20 attracts and by its auxiliary contact 20.2 energizes the magnetic coil 10.1 of the dog clutch 10. The contacts 20.1 are switched over and, since the switch 17 is closed, the motor 8 is energized to release the brake. The clutch 10 is operated by the magnetic coil 10.1 and the lever 11 is rotated in clockwise direction when viewed as shown in FIG. 1, thus, by means of the rods 13, the rings 14 and the springs 15 the brake shoes 2 are first continually freed of the pressure exerted by the springs 7 and are subsequently released. In this position, the cam disc 16 interrupts the switch 17 so that the motor 8 is de-energized and comes to rest.

For applying the brake the control switch 21 is opened whereby the electromagnet of the circuit breaker 20 is de-energized. The auxiliary contact 20.2 is opened. However, the magnetic coil 10.1 of the dog clutch 10 is short circuited by the rectifier 22 and the closed contact 19.1 so that the magnetic field of the coil 10.1 is initially maintained and the clutch remains operative for some time. Through the contacts 20.1 which have been switched over and the switch 18 which is now closed, the motor 8 is energized to rotate in the sense for applying the brakes. The lever 11 is rotated in counter-clockwise direction when viewed as shown in FIG. 1 so that the brake shoes 2 at a predetermined speed engage the brake disc 1, whereupon owing to the springs 15 being relieved slowly the full braking pressure exerted by the springs 7 becomes effective. It should be understood that the conditions are such that the springs 15 finally have some play between the brake levers 4 and the rings 14. In this position the brake applying movement is interrupted by the switch 18 being opened.

If while the brake is released the main supply fails, it is necessary that nevertheless the brake operates instantaneously. In such a case, the relay 19 and the electromagnet of the circuit breaker 20 are de-energized. Thereby the coil 10.1 without the delay circuit is de-energized and the dog clutch 10 instantaneously interrupts the connection between the gear arrangement 9 and the lever 11. Thereby the brake operates instantaneously under the action of the springs 7.

In the modified arrangement of FIG. 3 an electromagnetic circuit breaker 23.1 for releasing and an electromagnetic circuit breaker 24.1 for braking are provided for the control of the motor 8. A control switch comprises two contacts 21.1 and 21.2. The contact 21.1 lies in the circuit for the electromagnets of the circuit breakers and the contact 21.2 lies in the circuit for the coil 10.1 of the dog clutch 10.

It should be mentioned that the brake described may also be used in connection with hoisting devices and elevators.

The second embodiment of the brake shown in FIG. 4 comprises a brake disc 31 cooperating with brake shoes 32 which by means of pivots 33 are rotatably mounted on brake levers 34 which are rotatably mounted by pivots 35. A rod 36 is provided which transversely penetrates the brake levers 34, compression springs 37 being provided at the ends of the rod 36, the springs 37 surrounding the ends of the rod 36. Each spring 37 bears at one end against an abutment 36' on the rod 36 and at its other end against the respective brake lever 34 which is urged together with its brake shoe 32 towards the brake disc 31. On the rod 36 a casing 38 is supported which is displaceable relatively to said rod in the direction of the double arrow 39. In the casing 38 a worm 40 is provided which meshes with a toothed segment 41 mounted rotatably on a shaft 42 and carrying a roller 43 which bears against one end of a plunger 44 which is displaceably mounted in a bearing 45 of the casing and is parallel to the rod 36. The other end 48 of the plunger 44 protrudes from the casing 38 and bears against a resilient member 46 on one of the brake levers 34. The resilient member 46 comprises a guide sleeve 47 for the end 48, which is of reduced diameter, and a piston 50 against which bears a spring 49. The arrangement is such that by rotating the toothed segment 41 in clockwise direction the plunger 44 is displaced towards the righthand side when viewed as shown in FIG. 4 and thereby moves the brake lever 34 carrying the resilient member 46 away from the brake disc 31. The resilent member 46 ensures that the braking and the release of the brake is effected smoothly.

In the casing 38 an electromagnet 51 is provided an armature plate 52 of which is connected to one end of an operating shaft 53 by a screw 54. With one end a spring 55 urges the armature plate 52 against the electromagnet 51. The spring 55 with its other end bears against a partition wall 56 of the casing 38. The other end of the shaft 53 protrudes from the casing 38 and bears against the other brake lever 34. A set screw 57 enables adjustment of the release movement for the brake.

For operating the worm 40 a motor 58 is provided which drives a shaft 40' of the worm, the shaft 40' being connected to one end of a shaft 59 of the motor 58. The other end of the shaft 59 is provided with a screw-threaded spindle 60 carrying a nut 61. On rotation of the shaft 59 the nut 61 is displaced in one or the other sense along the spindle 60 and thereby operates a number of contacts 63 by means of a projection 62. An additional magnetic brake 64 is provided for braking the motor 58 and which is released by the motor. In the initial position illustrated the brake levers 34 are in the braking position and are under the action of the springs 37 which press against the levers 34. For releasing the brake the motor 58 is started so that the worm 40 rotates the toothed segment in clockwise direction. The roller 43 presses against the plunger 44. By the force exerted by the roller a reaction is created whereby the casing 38 is displaced towards the left-hand side. Simultaneously with the motor 58 the magnet 51 is energized so that the armature plate 52 is held by it.

When the current is interrupted the magnet 51 is de-energized so that the armature plate 52 is no longer held by the magnet 51. The plunger 53 does not participate in the displacement of the casing but remains in its original position. Thus, when during operation the current is interrupted an instantaneous braking takes place. During normal operation when the motor 58 is reversed a predetermined slow braking action can be obtained which is damped by the resilient member 46.

The contacts 63 stop the motor 58 in both end positions. After the motor has stopped the magnet remains in its attracted position.

What I claim is:

1. An electromagnetic brake comprising, in combination:
    (a) brake disc means;
    (b) a plurality of brake shoes;
    (c) a plurality of brake levers, said brake shoes being respectively mounted on said brake levers;
    (d) spring means permanently urging said brake shoes into braking engagement with said brake disc means;
    (e) an electric motor energizable for rotation in two opposite directions;
    (f) motion transmitting means interposed between said electric motor and said brake levers for respectively moving said brake shoes toward and away from said brake disc means when said motor rotates in said directions, said motion transmitting means including
        (1) self-holding gear means including a worm secured to said motor for rotation thereby, and a worm wheel engaging said worm, and
        (2) an electromagnetic clutch interposed between said worm wheel and said brake levers, said clutch including a spring for normally holding said clutch in a disengaged condition, and a magnet coil energizable for engaging said clutch against the force of said spring;
    (g) a time delay circuit shunted across said magnet coil and including rectifier means, the decay of the magnetic field of said magnet coil being delayed by said shunted circuit when said coil is deenergized;
    (h) a current supply circuit for said motor;
    (i) cam means movable responsive to said movements of said brake levers; and
    (j) cam actuated switch means operatively connected to said cam means for interrupting said current supply circuit when the brake shoes have been moved out of said engagement and when the brake shoes have been moved into said engagement, and (k) a control switch having two contacts respectively arranged in said current supply circuit of said motor and in circuit with said coil.

2. A brake as claimed in claim 1, further comprising an electromagnetic circuit breaker having switch-over contacts in said circuit, the motor being connected by said contacts for rotation to release the brake when the electro magnet of the circuit breaker is energized, and connected for rotation to apply the brake when the electro magnet of the circuit breaker is de-energized.

3. A brake as claimed in claim 1, further comprising two electromagnetic circuit breakers, one contact breaker having contact means in said circuit operative for rotating the motor to release the brake and the other contact breaker having contact means in said circuit operative for rotating the motor to apply the brake when the respective contact breaker is energized.

References Cited by the Examiner
UNITED STATES PATENTS

| | | | |
|---|---|---|---|
| 874,219 | 12/1907 | Mahoney | 188—173 |
| 1,272,038 | 7/1918 | Halsey | 188—173 |
| 1,348,106 | 7/1920 | Halsey | 188—173 |
| 2,039,509 | 5/1936 | Adams | 188—162 X |
| 2,251,521 | 8/1941 | McIntyre et al. | 188—162 |
| 2,350,636 | 6/1944 | Piron | 188—173 |
| 2,933,159 | 4/1960 | Stiebinger | 188—162 X |
| 2,949,979 | 8/1960 | Carroll | 188—171 X |

EUGENE G. BOTZ, *Primary Examiner.*

BROUGHTON G. DURHAM, A. JOSEPH GOLDBERG, ARTHUR L. LA POINT, *Examiners.*